(12) United States Patent
Wakefield et al.

(10) Patent No.: US 6,209,219 B1
(45) Date of Patent: Apr. 3, 2001

(54) MEASURING DEVICE WITH HOUSING ORIENTATION INDICATOR AND POSITION TRANSFERRING FOCUSED LIGHT-BEAM SOURCE

(75) Inventors: David L. Wakefield, North Branford; Viresh Bijawat, North Haven, both of CT (US)

(73) Assignee: The Stanley Works, New Britain, CT (US)

( * ) Notice: Subject to any disclaimer, the term of this patent is extended or adjusted under 35 U.S.C. 154(b) by 0 days.

(21) Appl. No.: 09/363,394

(22) Filed: Jul. 29, 1999

Related U.S. Application Data
(60) Provisional application No. 60/094,722, filed on Jul. 30, 1998.

(51) Int. Cl.$^7$ .................................................. G01B 3/10
(52) U.S. Cl. .............................. 33/761; 33/768; 33/227; 33/DIG. 21
(58) Field of Search ........................... 33/DIG. 21, 768, 33/769, 770, 263, 227, 275 R, 390, 761, 760

(56) References Cited

U.S. PATENT DOCUMENTS

| | | | |
|---|---|---|---|
| 1,204,768 | * 11/1916 | Hommel | 33/390 |
| 1,422,231 | * 7/1922 | Stanley | 33/390 |
| 2,877,555 | * 3/1959 | Visockis | 33/275 R |
| 3,771,876 | 11/1973 | Ljungdahl et al. . | |
| 3,832,782 | * 9/1974 | Johnson et al. | 33/88 |
| 3,897,637 | 8/1975 | Genho . | |
| 4,221,483 | 9/1980 | Rando . | |
| 4,295,279 | * 10/1981 | Sienknecht | 33/334 |
| 4,417,816 | 11/1983 | Kindl et al. . | |
| 4,432,146 | * 2/1984 | Klein | 33/334 |
| 4,438,538 | * 3/1984 | Larsen | 33/760 |
| 4,679,937 | 7/1987 | Cain et al. . | |
| 4,697,349 | * 10/1987 | Lee | 33/27.03 |
| 4,700,489 | 10/1987 | Vasile . | |
| 4,781,457 | 11/1988 | Hirano et al. . | |
| 4,852,265 | 8/1989 | Rando et al. . | |
| 4,912,851 | 4/1990 | Rando et al. . | |
| 5,075,977 | * 12/1991 | Rando | 33/227 |
| 5,077,910 | 1/1992 | Smith . | |
| 5,092,057 | 3/1992 | Hoenig, Sr. . | |
| 5,182,863 | 2/1993 | Rando . | |
| 5,287,627 | 2/1994 | Rando . | |
| 5,430,952 | * 7/1995 | Betts | 33/760 |
| 5,456,014 | * 10/1995 | Wilson | 33/390 |
| 5,509,210 | * 4/1996 | Murphy | 33/382 |
| 5,531,031 | 7/1996 | Green . | |
| 5,594,993 | * 1/1997 | Tager et al. | 33/227 |
| 5,685,083 | * 11/1997 | Decesare | 33/390 |
| 5,839,200 | * 11/1998 | Decesare | 33/381 |
| 5,894,675 | * 4/1999 | Cericola | 33/451 |

FOREIGN PATENT DOCUMENTS

| | | |
|---|---|---|
| 196 46 779 | 5/1998 | (DE) . |
| 2 233 595 | 1/1975 | (FR) . |
| 2 229 822A | 10/1990 | (GB) . |

\* cited by examiner

*Primary Examiner*—Diego Gutierrez
(74) *Attorney, Agent, or Firm*—Pillsbury Winthrop LLP

(57) ABSTRACT

A measuring device includes a housing, a distance measuring apparatus carried on the housing, one or more housing orientation indicators, and a focused light beam source. Using the housing orientation indicators, the housing can be properly oriented so that a focused light beam emitted by the focused light beam source will illuminate a point on a remote surface to accurately transfer the position of the housing to the remote surface.

18 Claims, 2 Drawing Sheets

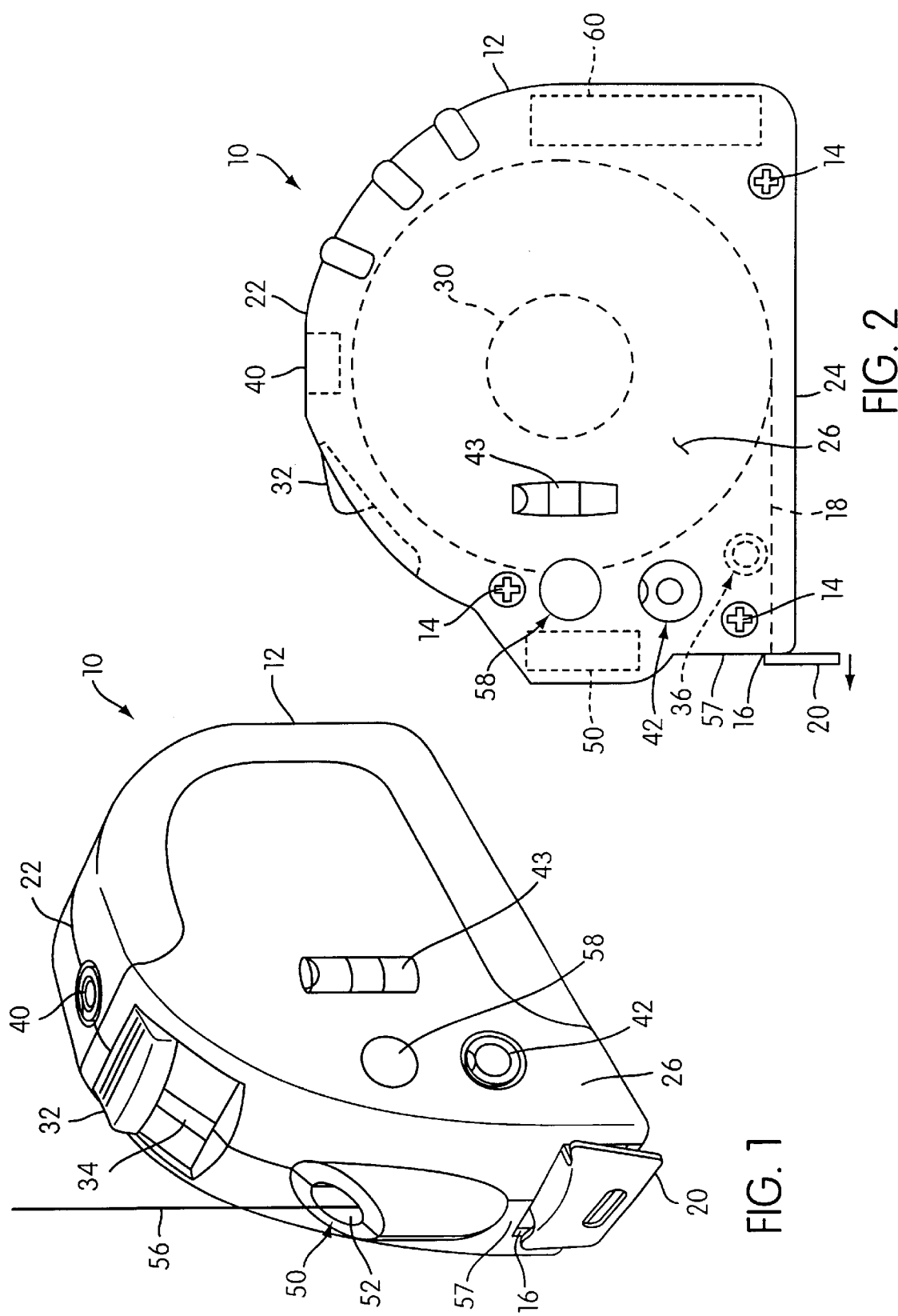

US 6,209,219 B1

MEASURING DEVICE WITH HOUSING ORIENTATION INDICATOR AND POSITION TRANSFERRING FOCUSED LIGHT-BEAM SOURCE

This application claims the benefit of U.S. Provisional Application No. 60/60/094,722 filed Jul. 30, 1998.

BACKGROUND OF THE INVENTION

This invention relates to a measuring device with a focused light-beam source that can be used to measure a distance of the device from a point on a reference plane and to illuminate a point on a surface remote from the device to indicate a point on the remote surface that is the same distance from the reference plane as the measured distance.

It is known to provide a measuring device, such as a coilable rule assembly, that incorporates a tilt compensated laser beam for projecting the position of the assembly onto a surface remote therefrom (see, e.g., U.S. Pat. Nos. 5,182,863; 5,287,627; and 5,075,977). Such a device requires the use of a tilt compensating pendulum that carries a mirror to ensure that the laser beam is always plumb. The device disclosed in the patents, however, is a relatively complex mechanism, and is expensive to manufacture. Moreover, even with such complexity, said device cannot simultaneously provide the user with a direct indication of whether a surface being measured is level or plumb.

Accordingly, a need exists for a measuring device that obviates the shortcomings of the prior art.

SUMMARY OF THE INVENTION

In accordance with a preferred embodiment of the present invention, a measuring device comprises a housing, a distance measuring apparatus, a focused light-beam source, and a housing orientation indicator.

The distance measuring apparatus is carried by the housing and is adapted to measure a distance between a reference point on a reference plane and the housing along a measuring axis that is perpendicular to the reference plane. The focused light-beam source is carried by said housing and is adapted to emit a focused light beam from the housing. The housing orientation indicator is carried by the housing and is oriented with respect to the focused light beam source so as to indicate whether the focused light beam source is in a level or plumb orientation. Thus, when the housing orientation indicator provides the level or plumb indication, the focused light beam is projected from the housing onto a remote surface at a point on the remote surface that is spaced from the reference plane, along an axis that is parallel to the measuring axis, by a distance that is the same as the distance, along the measuring axis, between the reference point on the reference plane and the housing. The housing orientation indicator is also oriented with respect to a housing surface so as to indicate whether a surface upon which the housing surface rests is in a plumb or level orientation.

Other features and characteristics of the present invention, as well as the methods of operation of the invention and the function and interrelation of the elements of structure, will become more apparent upon consideration of the following description and the appended claims with reference to the accompanying drawings, all of which form a part of this disclosure, wherein like reference numerals designate corresponding parts in the various figures.

BRIEF DESCRIPTION OF THE DRAWINGS

FIG. 1 is a perspective view of the measuring device of the present invention;

FIG. 2 is a side elevation of the measuring device; and

DETAILED DESCRIPTION OF THE PREFERRED EMBODIMENT

Figure 3:
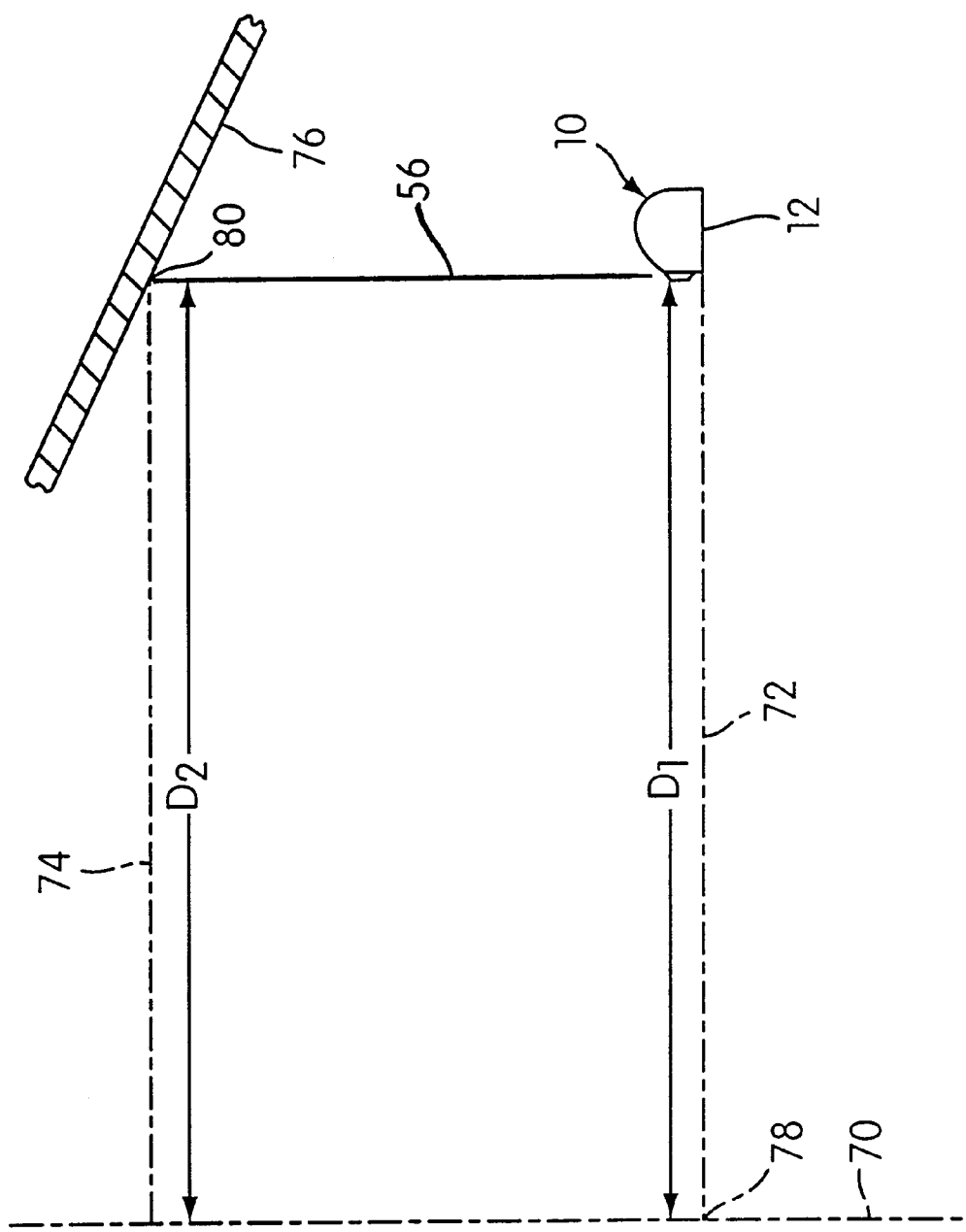
FIG. 3 is a schematic diagram illustrating operation of the measuring device.

A measuring device according to the present invention is designated generally by reference number 10 in FIGS. 1 and 2. In the illustrated embodiment, the measuring device 10 comprising a coilable rule assembly which constitutes a measuring instrument commonly known as a tape rule measure. The measuring device may also constitute other measuring instruments, such as fixed rule measuring blades, or instruments that determine distances by electronic or other non-physical means, such as by reflected ultrasonic waves or laser beams.

The measuring device 10 includes a housing 12 formed of separate mating halves held together by a plurality of fasteners 14, such as screws, and cooperating with one another to define an interior chamber with an opening 16. The mating halves defining the housing 12 may be formed of injected molded plastic, die cast metal, or any other suitable material.

The device includes a distance measuring apparatus. In the illustrated embodiment, the apparatus comprises an elongated flexible rule blade 18, also known as a tape, which is carried on a controllable spring-biased reel assembly 30 disposed within the chamber defined within housing 12. As mentioned above, other distance measuring apparatuses are contemplated as well. Elongated rule blade 18 is preferably made of a strong material, such as steel, and includes measurement gradations and/or indicia printed or otherwise provided along the length thereof. A securement 20, preferably comprising a bent-over hook flange, is attached to a free end of the elongated blade and is preferably oriented generally perpendicularly to the blade. An opposite end of the elongated flexible rule blade is secured to the controllable spring-biased reel assembly 30.

The reel assembly 30 is constructed and arranged to wind the rule blade 18 into a coiled state within the chamber defined by housing 12 and to allow the rule blade 18 to be extended or pulled outwardly from the chamber through the opening 16 into an uncoiled state so as to be operable for measuring linear distances. The securement 20 allows a user to hook or secure one end of the blade 18 onto a ledge and then to extend the blade 18 from the chamber of the housing 12 against the internal spring-bias of reel assembly 30 by moving the housing 12 away from the ledge.

The device 10 preferably also includes a blade locking mechanism (not shown) actuated by a blade locking actuator 32. In the illustrated embodiment, blade locking actuator 32 comprises a slide button that is moved within a slot 34 to activate the blade-locking mechanism. The blade-locking mechanism can be selectively actuated by the actuator 32 to lock the elongated blade 18 into a desired position to prevent the blade from being further extended from the housing and from being wound into the housing by the spring-bias of reel assembly 30.

A guide roller 36 is preferably provided within the housing 12 for guiding movement of the blade 18.

The measuring device 10 preferably includes an upper housing orientation indicator 40, preferably disposed in a top surface 22 of the housing 12. Orientation indicator 40 preferably comprises a "bull's eye" level vial disposed in the top of the housing 12 and centered along the width of the top of the housing 12. The upper orientation indicator 40 is constructed and arranged to indicate when the housing 12 is in a preferred orientation (e.g., as when the housing is oriented such that its bottom surface 24 is resting on an essentially level surface, or when a laser beam 56 emitted from the housing 12 is substantially exactly vertically plumb, as will be described later). In the preferred orientation where the lower surface 24 of the housing rests on a horizontal surface, the orientation indicator 40 indicates whether the horizontal surface is level. With a bull's eye level vial, the preferred orientation is verified when a gas bubble within the liquid filled vial is centered in the bull's eye circle formed on the lens or window of the vial. Thus, the orientation indicator 40 is mounted in the housing such that when the bottom surface 24 rests on a level surface, the bubble will be generally centered in the bull's eye circle.

While only a single orientation indicator may be provided, the device 10 preferably also includes a side housing orientation indicator 43 disposed on the side 26 of the housing 12. Indicator 43 is preferably a barrel level vial and is constructed and arranged to indicate when the housing is in a preferred orientation. For example, the indicator 43 can be used to indicate when the vertical surface on which the housing surface 24 rests, such as a wall being measured, is plumb.

The present invention further contemplates that the housing 12 may be provided with a second bull's eye vial 42 on the side 26 of the housing. When the side of housing 12 opposite to side 26 is resting on a horizontal surface, the indicator 42 indicates when such horizontal surface is level as indicated by the gas bubble being centered within the vial. In addition, whether or not the housing is resting on a surface, when housing is disposed such that the gas bubble in indicator 42 is centered, the housing will be in a preferred orientation such that the laser beam 56 (as will be described later) emitted from the device will be substantially exactly level.

In FIGS. 1 and 2, the gas bubble is shown centered within the bull's eye circle of indicator 40 and is shown above (not centered) the centered position of indicators 42 and 43.

Orientation indicators need not necessarily be located on the top, side, or bottom of the housing 12, but could be positioned anywhere on the housing where the indicator would be operable to indicate a preferred orientation of the housing 12, or the level or plumb orientation of a surface. However, the illustrated positions are preferred. It is also contemplated that other types of orientation detectors may be employed, such as other types of conventional level and/or plumb vials.

The device 10 also includes a focused light-beam source 50 mounted on the housing 12. Light-beam source 50 preferably comprises a diode laser powered by a power source 60, such as one or more batteries, and controlled by an ON/OFF power button 58. Button 58 is preferably a push-button, but any other conventional button, such as a slide button, can be used. When switched ON with available power, the focused light-beam source 50 directs a focused light-beam 56, e.g., a laser beam, through an opening 52 formed in the housing 12. The light-beam source 50 is positioned within the housing so that its beam 56 is directed upwardly when the housing is set on its bottom surface 24 and to be preferably perpendicular with respect to the plane of the bottom surface 24. The light-beam source 50 is also preferably positioned and the housing 12 is so constructed that the beam 56 will be perpendicular to any generally flat surface upon which the bottom surface 24 of the housing 12 rests upon, even in the event that surface 24 is constructed to be non-planar. Similarly, the beam 56 will be preferably parallel to any generally flat vertical surface upon which the side surface of the housing opposite surface 26 rests.

Further, the beam 56 is preferably aligned with a terminating measuring position (known as the zero measuring position) of an extent of blade 18 pulled from the housing 12. More specifically, the beam is generally aligned or co-extensive with the front surface portion 57 of housing 12 immediately above the opening 16. This surface, and thus the laser beam, is substantially aligned with the "zero" mark on the rule blade 18 when the blade is fully coiled within the housing 12.

The focused light-beam source is constructed and arranged to emit a focused light-beam 56 directed toward a surface remote from the housing 12 to illuminate a small spot, i.e., a point, on the remote surface. When the housing is in a preferred orientation as verified by one of the orientation indicators, such as orientation indicators 40, 42, or 43, the illuminated point indicates a location on the remote surface corresponding to the location of the housing.

The laser beam 56 will be directed essentially exactly vertically plumb when the bubble in orientation indicator 40 is essentially centered within the bull's eye circle. The laser beam 56 will be directed essentially exactly horizontally level when the bubble in orientation indicator 43 is essentially centered in the vial.

Although the illustrated embodiment includes only a single focused light beam source, it is contemplated within the scope of the present invention to provide additional focused light beam sources as well. For example, a second focused light beam source can be oriented within the housing 12 so as to emit a beam that is orthogonal to both the beam 56 and the direction of measurement, i.e., the direction of extension of the blade 18.

Operation of the measuring device 10 is schematically illustrated in FIG. 3. Using the distance measuring apparatus of the device 10, a distance $D_1$, along a measuring axis 72 between the housing 12 and a reference point 78 on a reference plane 70, is determined. In a typical application, as described in more detail below, the plane 70 may correspond to a physical surface, such as a wall, floor, or ceiling of a room, but the plane 70 may also be wholly or partially imaginary. Using the beam 56, the position of the housing can be projected onto a remote surface 76. The orientation of the housing 12 is adjusted to get a proper level or plumb indication from the housing orientation indicator so that the beam 56 will be level or plumb, depending on whether the position of housing 12 is to be projected vertically or horizontally. When the housing 12 is properly oriented, the beam 56 will be perpendicular to the measuring axis 72 and, consequently, it will be parallel to the reference plane 70.

The beam 56 illuminates, and thereby indicates, a point 80 on the remote surface 76. If the housing is properly oriented, the distance $D_2$ between the point 80 and the reference plane 70, along an axis 74 that is parallel to measuring axis 72, will be identical to the distance $D_1$.

More particularly, by way of example, the elongated rule blade 18 may be extended from the housing 12 along a floor of a room to measure a specific distance from a wall or other reference point. With the housing 12 in an upright position with the upper housing orientation indicator 40 facing upwardly, the focused light-beam source 50, when switched ON, will illuminate a point on the ceiling in the room. If the housing is then placed in a preferred orientation, for example, such that surface 24 it rests on a horizontally level surface (e.g., a floor) as verified by the centered bubble in the orientation indicator 40, the point on the ceiling illuminated by the light beam 56 emitted by the light source 50 would correspond to a point essentially exactly vertically to the position measured by the blade 18 on the floor (e.g., as aligned with surface 57 on the housing 12). Thus, the distance from the wall as measured on the floor can be accurately transferred to the ceiling.

Of course, if the horizontal surface (e.g., floor) is not level, the housing 12 can be shimmed or manipulated into the preferred orientation so that the indicator 40 gives a level indication for the surface, so that the beam 56 will be projected vertically to a corresponding position on the opposing surface (e.g., ceiling) even though the horizontal surface (floor) is not level. Thus, a distance from a reference point measured along a non-level horizontal surface can accurately be transferred to the ceiling.

Similarly, the elongated rule blade 18 may be extended from the housing 12 along a wall of the room to measure a specific distance along the wall from a reference point, for example, a door, a window, or an intersecting wall. With the surface 24 resting on a vertical wall, the focused light-beam source 50, when switched ON, will illuminate a point on an opposing wall or surface in the room. If the housing is then disposed in preferred orientation, such as the surface 24 resting on a plumb vertical surface and orientation indicator 43 providing a plumb indication, the point on the opposing wall illuminated by the light beam 56 emitted by the light source 50 would correspond to the position on the wall being measured (e.g., corresponding to the same distance from a reference point). Thus, the measured position along one wall can be accurately transferred to the opposing wall. Otherwise stated, in a room with two parallel walls and a perpendicular wall extending therebetween, the device 10 can be used to measure a distance along one of the parallel walls from the perpendicular wall, and when orientation indicator 43 indicates a plumb condition, the laser beam 56 will point to a position on the opposite parallel wall which is the same distance from the perpendicular wall as that being measured. In the event that the wall being measured is not plumb, an approximated corresponding position on the opposing wall can be obtained by manipulating the housing 12 so that the indicator 43 does give a plumb indication.

The barrel indicator 43 can also be used to orient the laser beam 56 so that the beam is substantially exactly horizontally level, without regard to whether any wall is plumb. Bull's eye indicator 42 can be used for this same purpose.

It should be appreciated that the side surface of the housing opposite surface 26 can be used in a similar manner to surface 24. For example, when this opposite surface is resting against a horizontal surface, the orientation detector 42 can be used to indicate when such horizontal surface is level, and the laser beam 56 can be used to point to an adjacent vertical surface.

The foregoing description and accompanying drawings of the preferred embodiment are merely illustrative in nature, and that the present invention includes all other embodiments and equivalents that are within the spirit and scope of the described embodiment.

Furthermore, it should be noted that those of the appended claims that do not include language in the 'means for performing a specified function' format permitted under 35 U.S.C. §112(¶6) are intended to not be interpreted under 35 U.S.C. §112(¶6) as being limited to the structure, material, or acts described in the present specification and their equivalents.

What is claimed is:

1. A measuring device comprising:
   a housing comprising two separate mating halves that cooperate to define an interior chamber;
   a distance measuring apparatus mounted within said interior chamber and constructed and arranged to measure a distance between a reference point on a reference plane and said housing along a measuring axis that is perpendicular to the reference plane;
   a focused light-beam source mounted to at least one of said two mating halves of said housing and constructed and arranged to emit a focused light-beam from said housing; and
   a housing orientation indicator carried by said housing and oriented with respect to said focused light-beam source so as to indicate whether said focused light-beam source is in a level or plumb orientation, so that when said housing orientation indicator provides said level or plumb indication, said focused light-beam is projected from said housing onto a remote surface at a point on the remote surface that is spaced from the reference plane, along an axis that is parallel to the measuring axis, by a distance that is the same as the distance, along the measuring axis, between the reference point on the reference plane and said housing,
   said housing orientation indicator also being oriented with respect to a housing surface so as to indicate whether a surface upon which said housing surface rests is in a plumb or level orientation.

2. The measuring device of claim 1, wherein said distance measuring apparatus comprises:
   an elongated flexible rule blade; and
   a controllable spring-biased reel assembly mounted within a chamber defined by said housing having one end of said rule blade connected thereto, said controllable spring-biased reel assembly being constructed and arranged to wind said rule blade into a coiled state within said chamber and to allow said rule blade to be extended outwardly of said chamber through an opening formed in said housing into an uncoiled state.

3. The measuring device of claim 1, wherein said focused light beam source comprises a laser constructed and arranged to generate a laser beam.

4. The measuring device of claim 1, wherein said housing orientation indicator comprises a bull's eye vial mounted on said housing so as to be viewable by a user.

5. The measuring device of claim 4, wherein said housing includes a flat reference surface and said bull's eye vial is constructed and arranged to indicate when said reference surface is in a level orientation.

6. The measuring device according to claim 5, wherein said housing orientation indicator further comprises a barrel level vial mounted on a side surface of said housing and constructed and arranged to indicate if said reference surface is in a plumb orientation.

7. The measuring device according to claim 6, wherein said housing further includes a second reference surface and said housing orientation indicator further includes a second bull's eye vial mounted on said housing so as to be viewable by a user and constructed and arranged to indicate when said second reference surface is in a level orientation.

8. The measuring device of claim 1, wherein said focused light beam source is constructed and arranged so that the focused light beam emitted thereby is aligned with a portion of the distance measuring apparatus corresponding to a terminus of a distance measured with said distance measuring apparatus.

9. A measuring device according to claim 1, wherein said distance between said reference point on the reference plane and said housing is the distance between the reference point and a surface of the housing aligned with the focused light-beam.

10. A coilable rule assembly comprising:
   a housing comprising two separate mating halves that cooperate to define an interior chamber having an opening;
   an elongated, coilable flexible rule blade;
   a controllable spring-biased reel assembly mounted within said interior chamber having one end of said rule blade connected thereto,
   said controllable spring biased reel assembly being constructed and arranged to wind said rule blade into a coiled state within said interior chamber and to allow said rule blade to be extended outwardly of said chamber opening into an uncoiled state;
   a housing orientation indicator carried by said housing and constructed and arranged to indicate when said housing is in a preferred orientation; and
   a focused light-beam source mounted to at least one of said two mating halves of said housing and constructed and arranged to emit a focused light-beam from said housing to a point on a surface remote from said housing to indicate a location on said surface corresponding to a location of said housing when said housing is in said preferred orientation.

11. A coilable rule assembly according to claim 10, wherein said focused light beam source comprises a laser constructed and arranged to generate a laser beam.

12. The coilable rule assembly according to claim 10, wherein said housing orientation indicator comprises a bull's eye vial mounted on said housing so as to be viewable by a user.

13. The coilable rule assembly according to claim 12, wherein said housing includes a flat reference surface and said bull's eye vial is constructed and arranged to indicate when said reference surface is in a level orientation.

14. The coilable rule assembly according to claim 13, wherein said housing orientation indicator further comprises a barrel level vial mounted on a side surface of said housing and constructed and arranged to indicate if said reference surface is in a plumb orientation.

15. The coilable rule assembly according to claim 14, wherein said housing further includes a second reference surface and said housing orientation indicator further includes a second bull's eye vial mounted on said housing so as to be viewable by a user and constructed and arranged to indicate when said second reference surface is in a level orientation.

16. The coilable rule assembly of claim 10, wherein said focused light beam source is constructed and arranged so that the focused light beam emitted thereby is aligned with a portion of said rule blade corresponding to a terminus of a distance measured with said distance measuring apparatus.

17. A measuring device according to claim 10, wherein said distance between said reference point on the reference plane and said housing is the distance between the reference point and a surface of the housing aligned with the focused light-beam.

18. A measuring device comprising:
   a housing comprising two separate mating halves that cooperate to define an interior chamber having an opening;
   an elongated flexible rule blade;
   a controllable spring-biased reel assembly mounted within said interior chamber having one end of said rule blade connected thereto,
   said controllable spring biased reel assembly being constructed and arranged to wind said rule blade into a coiled state within said interior chamber and to allow said rule blade to be extended outwardly of said chamber opening into an uncoiled state;
   a housing orientation indicator carried by said housing and constructed and arranged to indicate when said housing is in a preferred orientation;
   a focused light-beam source mounted to at least one of said two mating halves of said housing and constructed and arranged to emit a focused light beam from said housing to a point on a surface remote from said housing to indicate a location on said surface corresponding to a location of said housing when said housing is in said preferred orientation; and
   wherein said focused light-beam source is constructed and arranged so that the focused light-beam emitted thereby is generally perpendicular to said elongated flexible rule blade at a portion thereof corresponding to a terminus of a distance measured with said rule blade.

* * * * *